US008560845B2

(12) United States Patent
Krstić et al.

(10) Patent No.: US 8,560,845 B2
(45) Date of Patent: Oct. 15, 2013

(54) SYSTEM AND METHOD FOR TAMPER-RESISTANT BOOTING

(75) Inventors: Ivan Krstić, Sunnyvale, CA (US); Joel Even, San Jose, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 13/007,529

(22) Filed: Jan. 14, 2011

(65) Prior Publication Data

US 2012/0185683 A1     Jul. 19, 2012

(51) Int. Cl.
*H04L 29/06* (2006.01)
(52) U.S. Cl.
USPC ............. 713/164; 713/168; 713/2; 713/161
(58) Field of Classification Search
None
See application file for complete search history.

(56) References Cited

U.S. PATENT DOCUMENTS

| | | | |
|---|---|---|---|
| 7,360,073 B1 * | 4/2008 | Billstrom et al. ............... | 713/2 |
| 2005/0273858 A1 | 12/2005 | Zadok et al. | |
| 2007/0039042 A1 * | 2/2007 | Apelbaum ................... | 726/6 |
| 2010/0082963 A1 * | 4/2010 | Li et al. ....................... | 713/2 |
| 2010/0106976 A1 * | 4/2010 | Aciicmez et al. ............ | 713/189 |
| 2012/0102331 A1 * | 4/2012 | Russo .......................... | 713/183 |
| 2012/0151199 A1 * | 6/2012 | Shriver ........................ | 713/2 |
| 2012/0151223 A1 * | 6/2012 | Conde et al. ................. | 713/193 |

FOREIGN PATENT DOCUMENTS

WO    WO 2006/043023 A1    4/2006

OTHER PUBLICATIONS

PCT Invitation to Pay Additional Fees and, Where Applicable, Protest Fee for PCT/US2012/021215 mailed Oct. 5, 2012.
Alexander Tereshkin, "Evil maid goes after PGP whole disk encryption", Proceedings of the 3$^{rd}$ International Conference on Security of Information and Networks, SIN '10, Jan. 1, 2010, p. 2.
Li, Jun et al., "Trusted full disk encryption model based on TPM", Information Science and Engineering (ICISE), 2010 2$^{nd}$ International Conference on, IEEE, Piscataway, NJ, USA, Dec. 4, 2010, pp. 1-4.
Kevin Butler et al., "Firma: Disk-Based Foundations for Trusted Operating Systems", Apr. 20, 2009, retrieved from the Internet: url: http://www.cse.psu.edu/~butler/pubs/firma.pdf [retrieved on Sep. 7, 2012].
Anonymous, "Bitlocker Drive Encryption: Technical Overview", Internet Citation, Apr. 4, 2006, retrieved from the Internet: url: http://technet.microsoft.com/en-us/windowsvista/aa906017 (d=printer). aspx [retrieved on Mar. 22, 2007].

* cited by examiner

*Primary Examiner* — Andrew L Nalven
*Assistant Examiner* — Mohammed Waliullah
(74) *Attorney, Agent, or Firm* — Blakely, Sokoloff, Taylor & Zafman LLP

(57) ABSTRACT

Disclosed herein are systems, methods, and non-transitory computer-readable storage media for booting a computing device having an encrypted storage medium using full disk encryption, referred to as tamper-resistant boot. The system retrieves a kernel cache and a kernel cache digest from an unencrypted storage medium and verifies the authenticity of the kernel cache based on the credentials and the kernel cache digest. Initiation and execution of the operating system is performed if the kernel cache is authentic. In one embodiment, the system verifies the authenticity of a request to disable tamper-resistant booting by utilizing a password verifier and a password proof.

17 Claims, 11 Drawing Sheets n = 100   P = PASSWORD   s = SALT VALUE

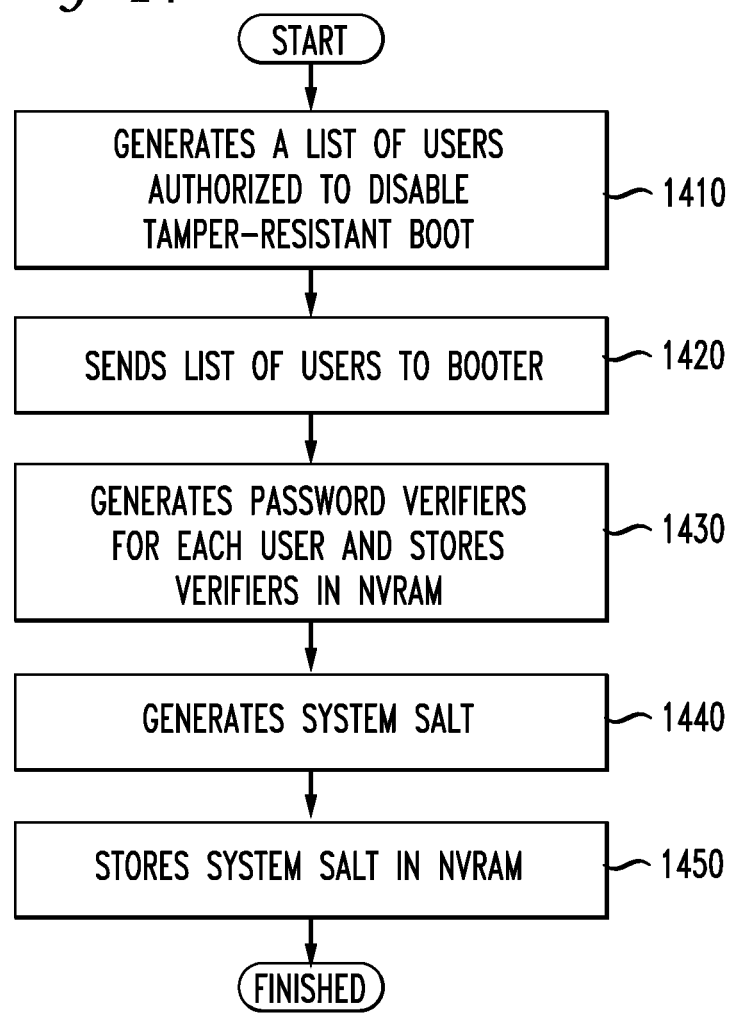

SYSTEM AND METHOD FOR TAMPER-RESISTANT BOOTING

BACKGROUND

1. Technical Field

The present disclosure relates to encryption and more specifically to tamper-resistant booting of a computing device.

2. Introduction

Many computing devices today require some degree of information protection. Cryptography is one such method utilized in protecting computing devices. Cryptography refers to both encryption and decryption of information. Encryption is the process of changing intelligible information (plaintext) into unintelligible information (ciphertext) and decryption is the process of changing ciphertext back into plaintext.

Computing devices can encrypt data of varying sizes, from small sets to large blocks of data. Full-disk encryption (FDE) is a method that encrypts an entire disk volume on a computing device. Decryption of the entire disk volume is necessary before the disk volume is accessible. Full-disk encryption is considered more secure than file-level encryption since all files (including temporary files) are encrypted.

Although FDE is considered more secure than file-level encryption, systems with FDE employed are still vulnerable to attack. In one simple attack, a hacker can change the boot sequence of a computing device so that it boots from the hacker's own malicious code instead of performing the normal boot sequence. FDE systems must prompt the user for a password at boot time in order to unlock the FDE volume. The hacker's malicious code can display an identical looking screen that asks for the FDE password, but steals it instead of using the password to unlock the FDE volume. When the user enters the password, the hacker logs it and gains access to the computing device. The hacker can therefore surreptitiously steal the user's password. Without a chain of trust from the booter to the operating system kernel, such attacks are able to defeat even full-disk encrypted computing devices.

SUMMARY

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for booting a computing device having an encrypted storage medium using full disk encryption, referred to as tamper-resistant booting. One way to remedy the attacks outlined above is called tamper-resistant boot. When a computing device employs a high-security mode such as FDE, it should be more difficult for a hacker to change the boot sequence than when operating under lower-security modes. However, even in a computing device with an FDE-enabled storage medium, the operating system kernel is not encrypted. This is because the boot environment is not sufficiently complex to decrypt FDE volumes. Instead, the boot environment must rely on an operating system kernel to do the decryption. The unencrypted operating system kernel is an obvious weak link in the overall FDE security model, as it can be surreptitiously replaced with malicious password-stealing code by an attacker. One way for a computing device to address this deficiency is to verify the authenticity of the boot sequence by establishing a chain of trust from the firmware to the kernel in the operating system. FIG. 1 illustrates an exemplary system 100 that can practice the methods disclosed herein. A system 100 receives at a boot time credentials associated with a volume key for a FDE enabled encrypted storage medium from a user. The system retrieves the unencrypted kernel and unencrypted kernel cache digest from the storage medium. The system then verifies that the kernel cache is authentic by comparing the retrieved kernel cache digest with a computed digest. Initiation and execution of the operating system is performed if the system determines that the kernel cache is authentic. The system produces an error if the kernel cache is not authentic.

A system practicing the method initiates the tamper-resistant booting process by first generating a volume key based on a full disk encryption password received from a user. The system encrypts the storage medium with the volume key to yield a full disk encrypted storage medium. Then the system encrypts the kernel cache with the full disk encryption volume key to yield a kernel cache digest, which the system stores on an unencrypted storage medium or an unencrypted portion of an otherwise encrypted storage medium, alongside the kernel cache itself. When the system boots, it verifies the integrity of the kernel cache based on the stored kernel cache digest and a computed digest.

The system verifies that the operating system has not been tampered with by booting the system with firmware and confirming, via the firmware, the integrity of the booter. The system passes control to the booter where the booter confirms a kernel cache of the operating system based on a stored kernel cache digest and a computed digest. Once the system determines that the operating system has not been tampered with, it passes control to the operating system for initiation and execution and any remaining boot tasks.

In one embodiment, the system disables tamper-resistant booting by generating, at the firmware level, a password verifier and comparing it to a password proof. The system generates the password verifier by applying a number of iterations of an encryption algorithm to a salt value and a password. Once the system receives a request from a user to disable tamper-resistant booting, the operating system generates a partial password proof. Generating a partial password proof is accomplished by applying a portion of the number of iterations of the encryption algorithm to the request password and the salt value, and then rebooting the computing device. Once the system reboots, the firmware retrieves the partial password proof and performs the remaining portion of the number of iterations of the encryption algorithm to produce the complete password proof. If the password proof matches the password verifier, the system disables tamper-resistant booting. In this way, the system authenticates a request to disable tamper-resistant boot.

Additionally, the system initializes tamper-resistant booting by establishing a database that stores password verifiers. The operating system generates a list of users that are authorized to disable tamper-resistant booting and sends the list to the firmware. The operating system generates password verifiers for each user and sends them to the firmware as well. The firmware stores this database in non-volatile random access memory (NVRAM). The system also generates a system salt in the firmware and stores the system salt in NVRAM for later use. The principles disclosed herein apply to a computing device having an encrypted storage medium using full disk encryption.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 14 illustrates an exemplary method embodiment for establishing full disk encryption.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for verification of the authenticity of a boot sequence. A system, method and non-transitory computer-readable media are disclosed which boot a computing device having an encrypted storage medium using full disk encryption. A discussion of a basic general purpose system or computing device is provided in FIG. 1 which can be employed to practice the concepts disclosed herein. A more detailed description of the methods for establishing, managing, using, and removing tamper-resistant booting on computing devices using full disk encryption (FDE) will then follow. These variations shall be discussed herein as the various embodiments are set forth. The disclosure now turns to FIG. 1.

Figure 1:
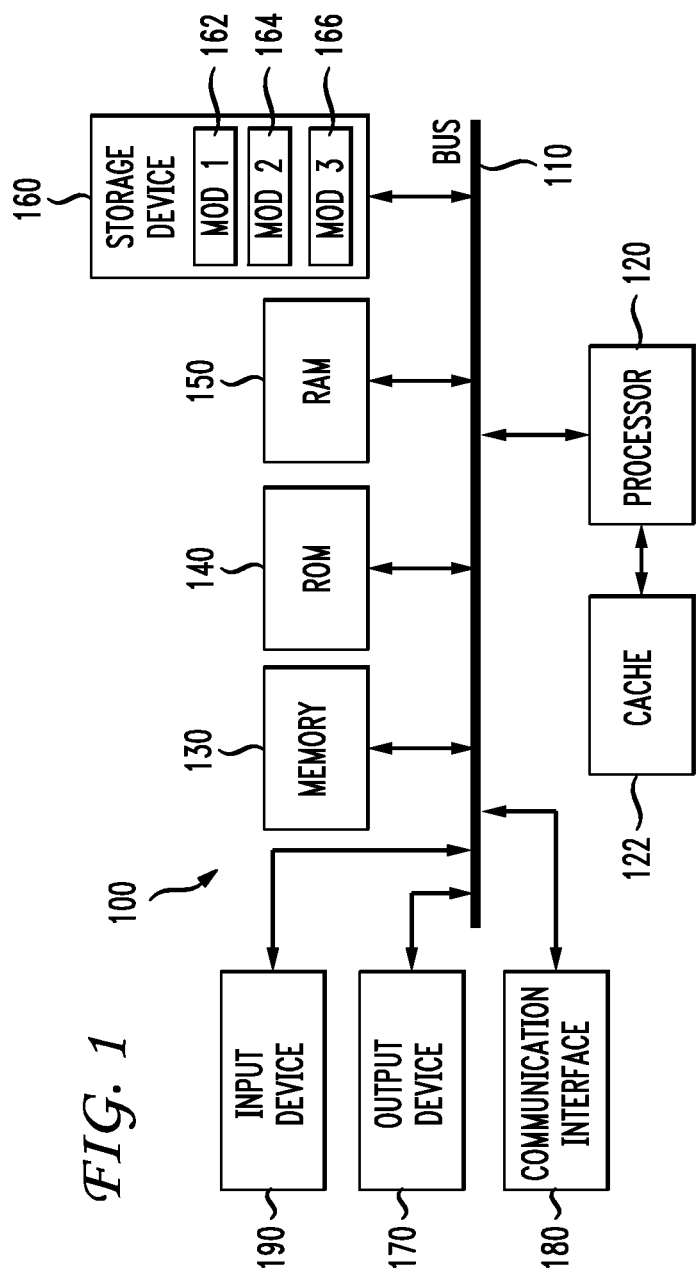
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors (use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
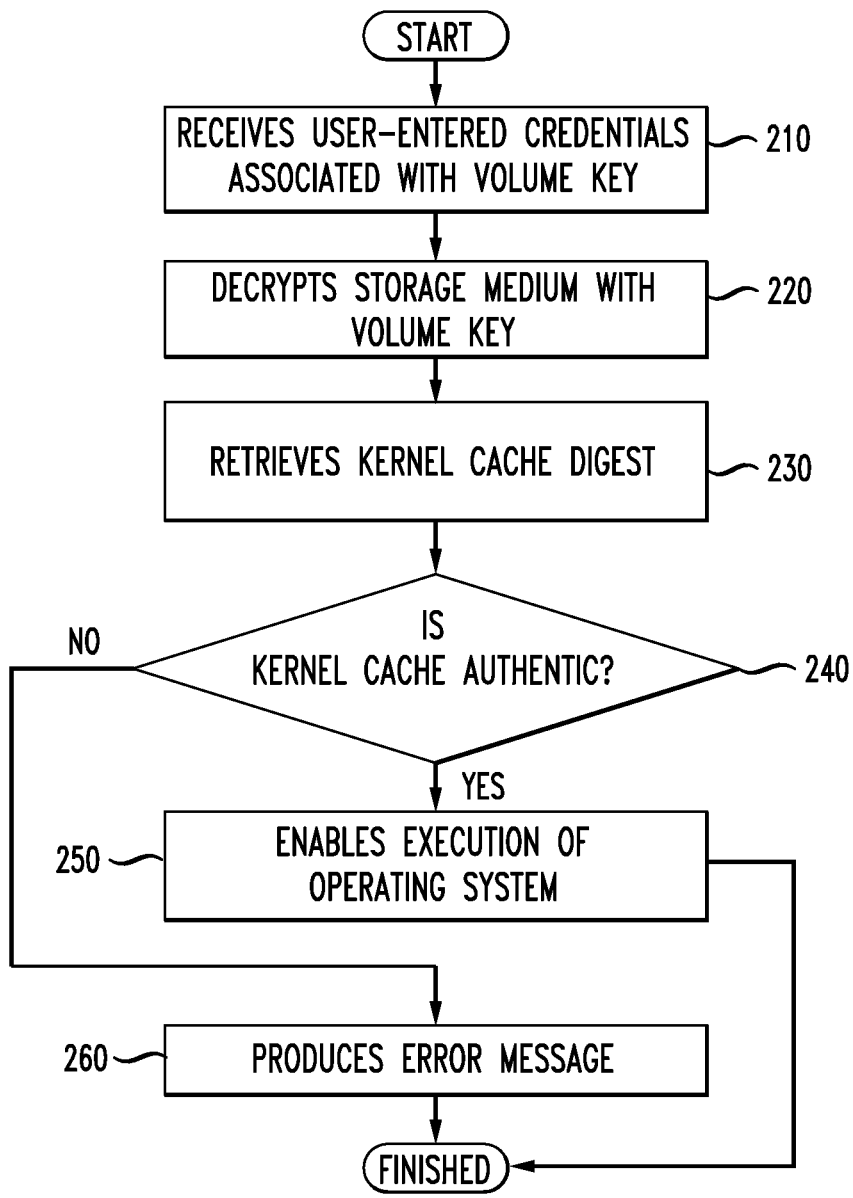
FIG. 2 illustrates an exemplary method embodiment for tamper-resistant booting.

Having disclosed some basic system components, the disclosure now returns to a discussion of tamper-resistant booting, as shown in the exemplary method embodiment of FIG. 2. For the sake of clarity, the method is discussed in terms of an exemplary system such as is shown in FIG. 1 configured to practice the method.

FIG. 2 illustrates an exemplary method embodiment for booting a computing device having an encrypted storage medium using full disk encryption, otherwise known as tamper-resistant booting. Tamper-resistant booting makes it more difficult for a hacker to change an authorized boot sequence in unauthorized ways or to insert his own unauthorized boot sequence. One way to protect the boot sequence is to establish a chain of trust from the firmware to the operating system kernel. Firmware refers to the fixed programs that control low-level basic operations of a device. However, while firmware is referred to as a "fixed" program, firmware updates can modify the functionality the firmware provides, in some instances. Firmware is typically stored in ROM, EEPROM, and the like for BIOS (Basic Input/Output System) based or EFI (Extensible Firmware Interface) based computer boot-up implementations. The kernel is a central component of the operating system that provides software applications with access to computing resources such as the hardware of a computing device, including the central processing unit (CPU), memory and other devices. In establishing the chain of trust, the firmware can confirm the integrity of the booter, but the booter cannot confirm the integrity of the kernel. A computer updates its kernel after leaving the manufacturing factory, and contains kernel extensions for a particular machine at boot. The kernel is customized for a particular user's machine. The booter must confirm the integrity of the kernel to protect the entire boot sequence.

When a system 100 uses full disk encryption, the volume key for the encrypted volume serves as a shared secret between the booter and the kernel. The booter must have the volume key in order to verify the password and pass it along to the operating system kernel that can then decrypt the disk. While the system is running, the kernel also has the full-disk encryption volume key in memory. At boot time, the booter uses the volume key to perform an integrity check on the kernel. The volume key can be the same as the password or can be derived based at least in part on the password.

The system 100 establishes a chain of trust from the firmware to the kernel to protect the boot sequence of a computing device. The system receives 210 credentials associated with a volume key from a user at a boot time. In cryptography, a credential is used to establish the identity of a user. Some examples of credentials include passwords, certificates or biometrics, such as a fingerprint or voiceprint. The volume key is the same as the credential, or some derivation thereof. For example, the volume key could be the user password, an encrypted version of the password, or the output of an algorithm that takes the user password as input. Once the system 100 establishes the volume key, the system retrieves 230 a kernel and a kernel cache digest generated by the operating system from an unencrypted storage medium. A kernel cache digest is generated using a cryptographic hash function, a secret key and the kernel cache. The kernel cache contains the kernel code and kernel extensions. A digest is also referred to as a hash value, message digest or hashed-message authentication code (HMAC). An HMAC may be used to verify both authenticity and integrity of a message simultaneously. A cryptographic hash function is a procedure that takes a block of data and returns a fixed-size bit string, referred to as the hash value or message digest. Any change in the block of data will change the digest. The kernel cache digest is a keyed hash of the kernel cache where the key is the FDE volume key.

Once the system retrieves the stored kernel cache digest, the system verifies 240 that the kernel cache is authentic based on the user-entered credentials and enables 250 initiation and execution of the operating system if the system determines that the kernel cache is authentic. The system produces an error 260 and does not execute the operating system if the kernel cache is not authentic. The system assumes that the computing device has been tampered with if it cannot verify the integrity of the kernel. This process is referred to as a tamper-resistant boot because integrity checks are performed at each stage in the boot process, making the system resistant to tampering and able to detect when critical portions of the boot process are altered without authorization.

A user can manually enable full-disk encryption or some automatic process can initiate full-disk encryption but most automatic processes require some user input, such as entering a password from which the system generates the volume key. The tamper-resistant boot process can be used when full-disk encryption is enabled and/or in other situations when some other suitable shared secret is available as a substitute for the full-disk encryption volume key.

Figure 3:
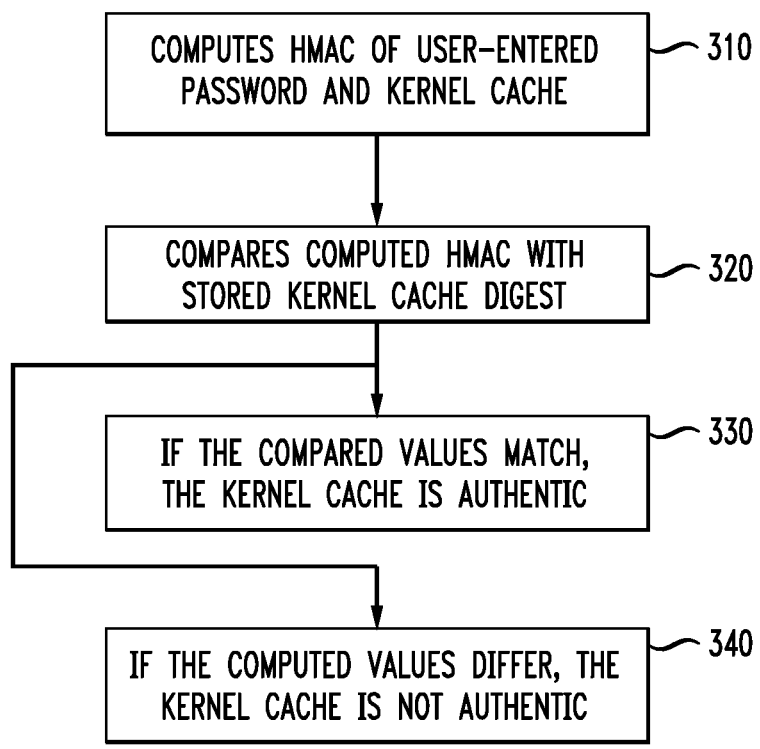
FIG. 3 illustrates authentication of a kernel cache.

FIG. 3 illustrates the authentication of a kernel cache, part of establishing a chain of trust from the firmware to the kernel. A system 100 verifies 240 that a kernel cache is authentic by computing 310 an HMAC using an encryption algorithm, the user-entered password and the kernel cache. The system 100 uses the kernel cache and the password as input to a cryptographic hash function, which outputs the HMAC. The system 100 compares 320 the computed HMAC with the stored kernel cache digest to determine if the operating system has been tampered with. If the compared values match 330, the operating system has not been tampered with and is considered authentic and the system can continue to boot. If the compared values differ 340, the operating system has changed since the kernel cache digest was created and is not authentic. At this point, the system can halt the boot process, prompt the user to reenter the password, send an alert to a remote device, and/or trigger any other desired action.

Figure 4:
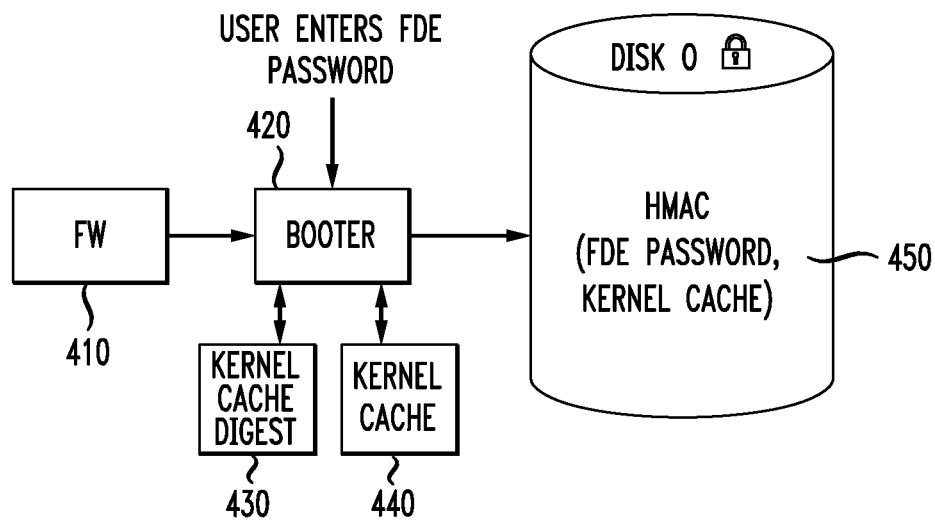
FIG. 4 illustrates establishing an example system embodiment.

FIG. 4 illustrates a tamper-resistant boot process. The system 100 verifies that the operating system has not been tampered with by booting the system with firmware 410 and confirming, via the firmware 410, the integrity of the booter 420. Once the system confirms the integrity of the booter via the firmware, the system passes control to the booter 420. The booter confirms a kernel cache 440 of the operating system based on a stored kernel cache digest 430 and password entered at boot time 420. The authenticity of the kernel cache is determined by computing 450 an HMAC using the kernel cache and a user-entered password. Once the boot process determines that the operating system has not been tampered with, the boot process passes control to the operating system for initiation and execution.

Figure 5:
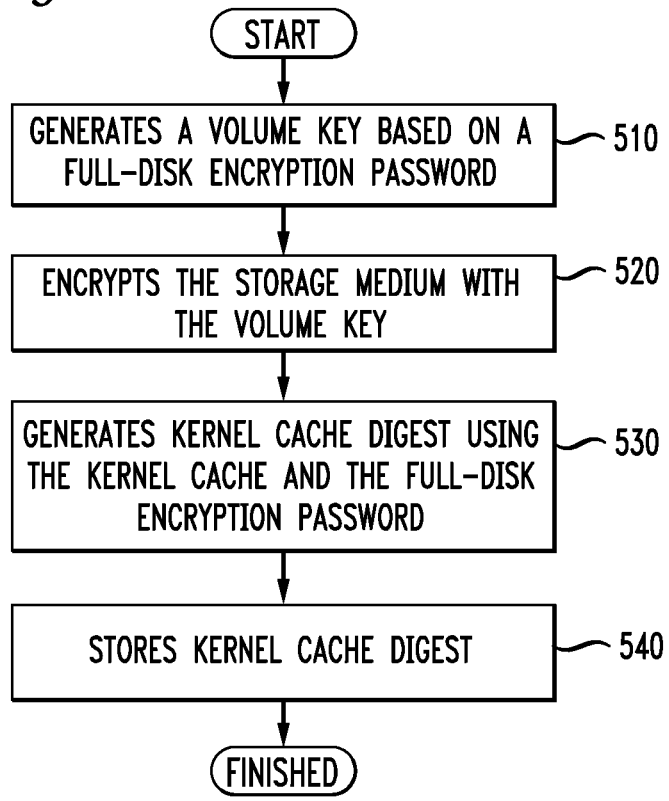
FIG. 5 illustrates an exemplary method embodiment for establishing the tamper-resistant booting.

FIG. 5 illustrates initiation of the tamper-resistant boot process. The system 100 initiates the tamper-resistant booting process by first generating a volume key 510 based on a full disk encryption password received from a user. The system 100 encrypts 520 the storage medium with the volume key to yield a full disk encrypted storage medium. The volume key can be generated as part of the setup process for full disk encryption and/or a user enrollment process. For example, if a user decides to set up full disk encryption on a storage volume, then the system prompts the user to enter a full disk encryption password or a password equivalent. Then the system generates a volume key based on the full disk encryption password, encrypts the volume with the volume key and can simultaneously use that same volume key for tamper-resistant booting. Then the system 100 generates 530 a kernel cache digest using the kernel cache and full disk volume key, which the system 100 stores on an unencrypted volume 540. When the system boots, it verifies the integrity of the kernel cache based on the stored kernel cache digest and a computed digest. In at least one variation, the system 100 stores the kernel cache digest in a location other than the encrypted storage volume because the boot environment is unable to unlock the full-disk encrypted volume because the unlocking process is too complex and requires a more full featured kernel. Thus the kernel cache cannot reside in the encrypted volume because the booter cannot unlock full-disk encrypted volumes. As a result, the kernel cache resides unencrypted on a volume separate from the full-disk encrypted volume, where the booter can reach the kernel cache without the need to perform decryption of which the booter is incapable. Even though the data is encrypted on a FDE volume, the kernel cache can be completely unprotected and subject to replacement by an attacker.

The kernel can reside on an unprotected volume, so long as a keyed HMAC digest (where the full-disk encryption volume key is used as the digest key) resides next to the kernel. Thus, an attacker can replace the kernel with a malicious one, but since the attacker does not know the full-disk encryption password, the attacker cannot create a matching digest file, and the booter will refuse to boot the malicious kernel.

Having discussed initiation and execution of the tamper-resistant booting process, the disclosure now discusses how to disable tamper-resistant booting of a computing device. A system 100 must first authenticate a request to disable tamper-resistant booting to verify that the request is valid, and did not come from a hacker. The system verifies that a request to disable tamper-resistant booting is valid by generating a password proof. Since the firmware and the operating system do not run at the same time, traditional approaches offer no viable way for the two processes to communicate with each other. The operating system can send information to the firmware and reboot the machine, allowing the firmware to receive the message from the operating system at boot time. However, in some situations multiple reboots are unacceptable, so the system is allowed to send commands to the firmware only once. The firmware is stored in a non-volatile random access memory (NVRAM) chip that is not writable but is readable by the operating system. The operating system cannot send a raw password since it is stored in plaintext, readable by the operating system. The operating system also cannot send a hash of the password since an attacker can read the hash and trigger the unlock mechanism. The operating system must send data that is unprotected, yet still verify the authenticity of the disable request. This is accomplished using a password verifier and a password proof.

Figure 6:
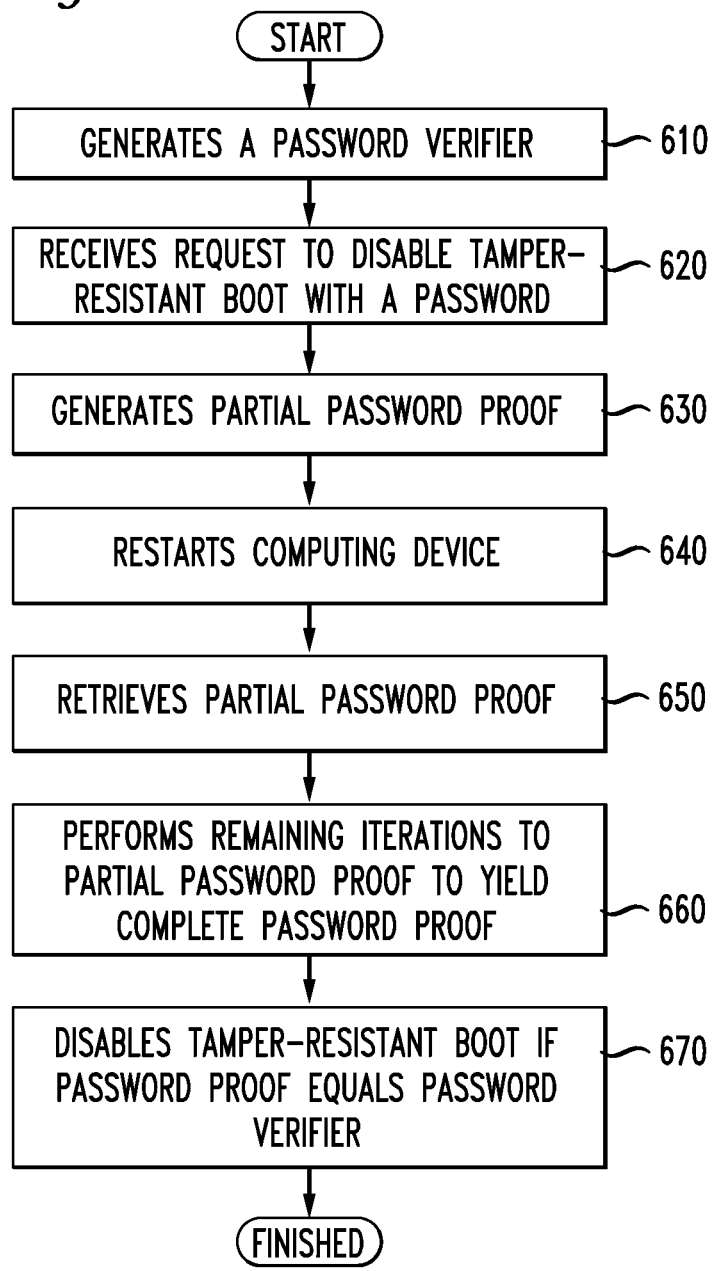
FIG. 6 illustrates an exemplary method embodiment for disabling tamper-resistant boot.

FIG. 6 illustrates disabling tamper-resistant booting by generating, at the firmware level, a password verifier and comparing it to a password proof. The system 100 generates the password verifier 610 and stores it for later use. The system 100 receives a request 620 and a password from a user to disable tamper-resistant boot. The operating system generates 630 a partial password proof by applying a portion of the number of iterations of the encryption algorithm to the request password and the salt value and then restarts 640 the computing device. Once the system reboots, the firmware retrieves 650 the partial password proof and performs 660 the remaining portion of the number of iterations of the encryption algorithm to yield a complete password proof. If the password proof matches the password verifier, the system 100 disables tamper-resistant booting 670. The system only disables tamper-resistant booting if it can verify that the request is authentic.

Figure 7:
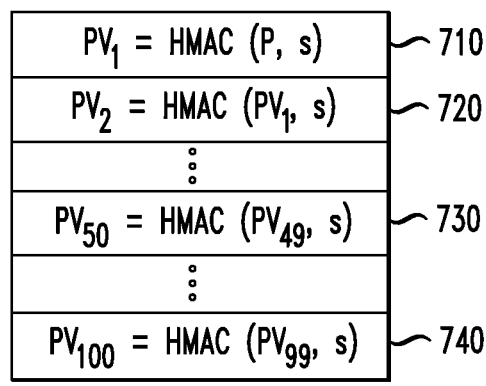
FIG. 7 illustrates generating a password verifier.
Figure 8:
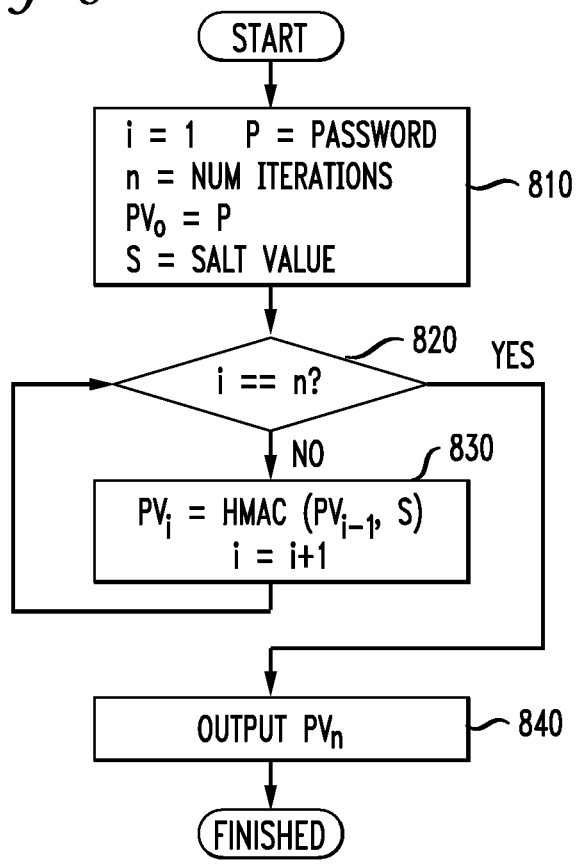
FIG. 8 illustrates an exemplary logic flow for generating a password verifier.

FIGS. 7 and 8 illustrate generating a password verifier. The system 100 generates the password verifier by performing multiple iterations of an encryption algorithm, utilizing the output of the preceding iteration as input to the current iteration 720. For example, the process uses $PV_1$ to generate $PV_2$, and uses $PV_{99}$ to generate $PV_{100}$. In the case of the first iteration 710, a password P is used as input since output from a preceding iteration does not exist. The system 100 generates the password verifier by performing, for example, 100 iterations 740. The password proof is derived from the output of one or more intermediate iteration, such as a halfway point iteration 730. In addition to using the output from a preceding iteration as input to the encryption algorithm, a salt value is used. A salt value contains random bits that are used as one of the inputs to a key derivation function, usually a cryptographic hash function. Salt data complicates attacks since it increases the amount of storage and computation required to determine a password. To determine a password from a stolen hash, an attacker must calculate the hashes of random characters thereby increasing the required computational time. In some scenarios, this process is limited to being performed by a processor on the device with the full disk encrypted volume. Accordingly, the number of iterations can be selected or determined based on the speed of the processor such that the time required for any attack is a function of the processor's speed and cannot easily be brute forced. The use of any cryptographic hash function in calculating an HMAC is possible, for example SHA-1 or MD5.

The generation of a password verifier requires 810 a password P, salt value S, the number of iterations to perform n and index i. The system compares 820 the index i to the number of iterations n to check if the required number of iterations are complete. If they are not equal, the process is not complete and additional iterations are required. Next, the system generates a round password verifier 830 for the current round, i. The generation 830 of the round password verifier $PV_i$ is performed using an encryption algorithm, the password verifier from the previous round $PV_{i-1}$ (if the current round is not one) and the salt value S. Since there is not a previous round verifier for the first round, the password P is used to initialize $PV_0$ 810. Next, the system increments the index 830 and compares the index to the number of iterations to check if the required number of iterations are complete 820. When the index equals the number of iterations, the process is complete and the system outputs the password verifier 840.

Figure 9:
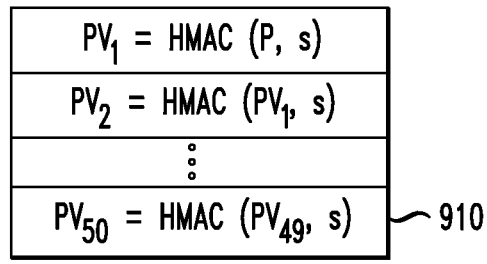
FIG. 9 illustrates generating a partial password proof.
Figure 10:
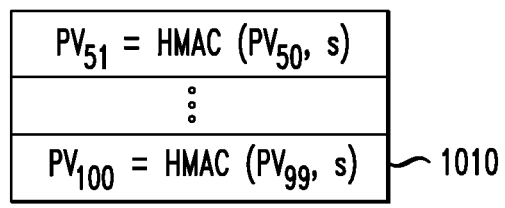
FIG. 10 illustrates generating a complete password proof.

The system generates a password verifier and password proof following the same process, with the exception that generating a password proof includes rebooting the computing device. The system performs only a portion of the total number of iterations required, usually half, and then reboots itself. Once the system has restarted, the remaining number of iterations is performed to yield the final password proof. FIGS. 9 and 10 illustrate generating a password proof. For example, when the total number of iterations required to generate a password proof is 100, the system generates 910 a partial password proof using 50 iterations and stores the result before rebooting. Once the system restarts, it retrieves the stored partial password proof and performs the remaining 50 iterations to yield 1010 the final password proof. The partial password proof can be generated at the halfway point or at some other point in the set of iterations. The partial password proof does not reveal any useful information about the original password, the number of iterations, the password verifier, or the password proof and thus is safe to store in plaintext and/or in a region of memory that other processes can read.

Figure 11:
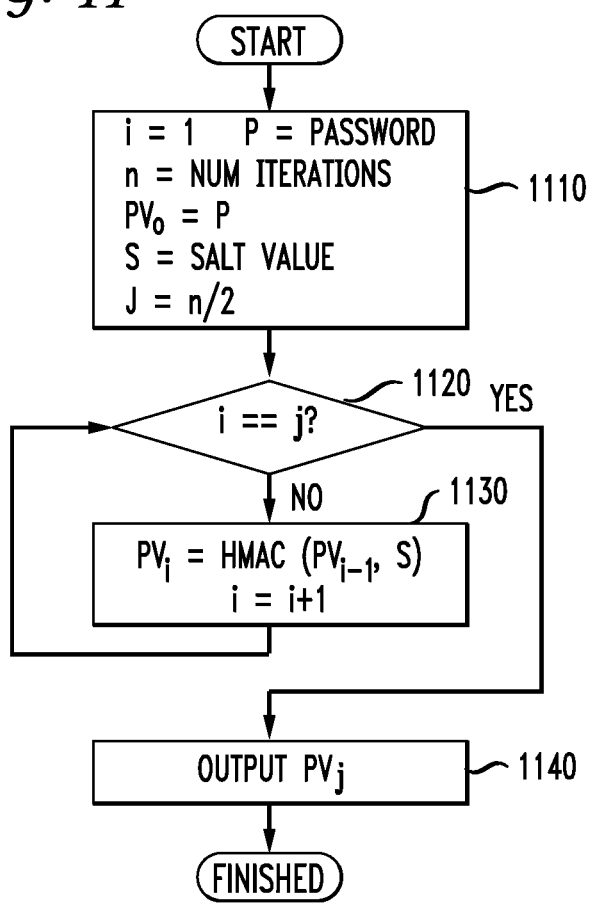
FIG. 11 illustrates an exemplary logic flow for generating a partial password proof.
Figure 12:
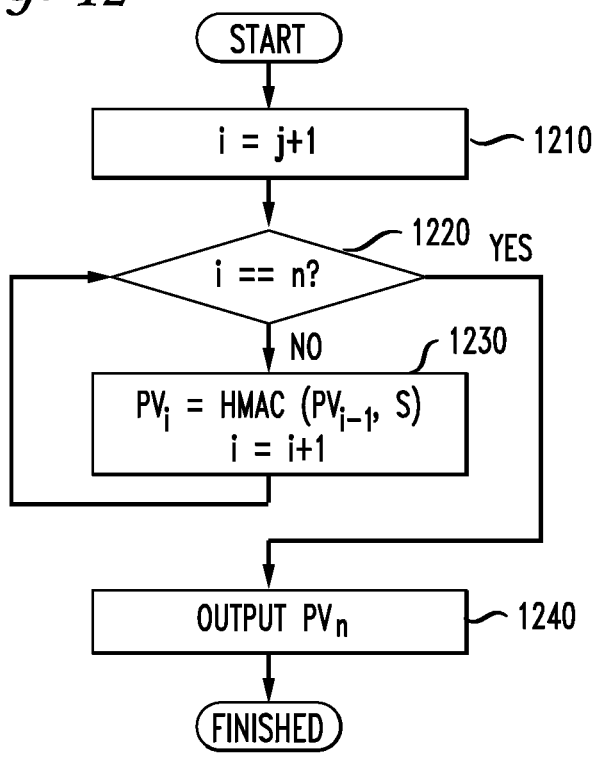
FIG. 12 illustrates an exemplary logic flow for generating a complete password proof.

FIGS. 11 and 12 illustrate generating a password proof. The system 100 generates the password proof by performing multiple iterations of an encryption algorithm, utilizing the output of the preceding iteration as input to the current iteration. For example, the process uses $PV_1$ to generate $PV_2$, and uses $PV_{99}$ to generate $PV_{100}$. In the case of the first iteration, a password P is used since output from a preceding iteration does not exist. In addition to using the output from a preceding iteration as input to the encryption algorithm, a salt value is used.

The generation of a password proof requires 1110 a password P, salt value S, the number of iterations to perform n, index i and index j, where j is the number of iterations divided by two. The system compares 1120 the index i to the index j to check if the required number of iterations are complete. If they are not equal, the process is not complete and additional iterations are required. Next, the system generates a round password verifier 1130 for the current round, i. The generation 1130 of the round password verifier $PV_i$ is performed using an encryption algorithm, the password verifier from the previous round $PV_{i-1}$ (if the current round is not one) and the salt value S. Since there is not a previous round verifier for the first round, the password P is used to initialize $PV_0$ 1110. Next, the system increments the index 1130 and compares the index to the number of iterations to check if the required number of iterations are complete 1120. When the index i equals the index j, the system stores the partial password proof 1140 and reboots the computing device.

Once the computing device reboots, the firmware computes the remaining iterations to yield a complete password proof. The index i is initialized 1210 to j+1 since half of the iterations have already been performed. The system compares 1220 the index i to the number of iterations n to check if the required number of iterations are complete. If they are not equal, the process is not complete and additional iterations are required. Next, the system generates a round password verifier 1230 for the current round, i. The generation 1230 of the round password verifier $PV_i$ is performed using an encryption algorithm, the password verifier from the previous round $PV_{i-1}$ and the salt value S. Next, the system increments the index 1230 and compares the index to the number of iterations to check if the required number of iterations are complete 1220. When the index i equals the number of iterations n, the process is complete, and the system outputs 1240 the complete password proof, $PV_a$.

Figure 13:
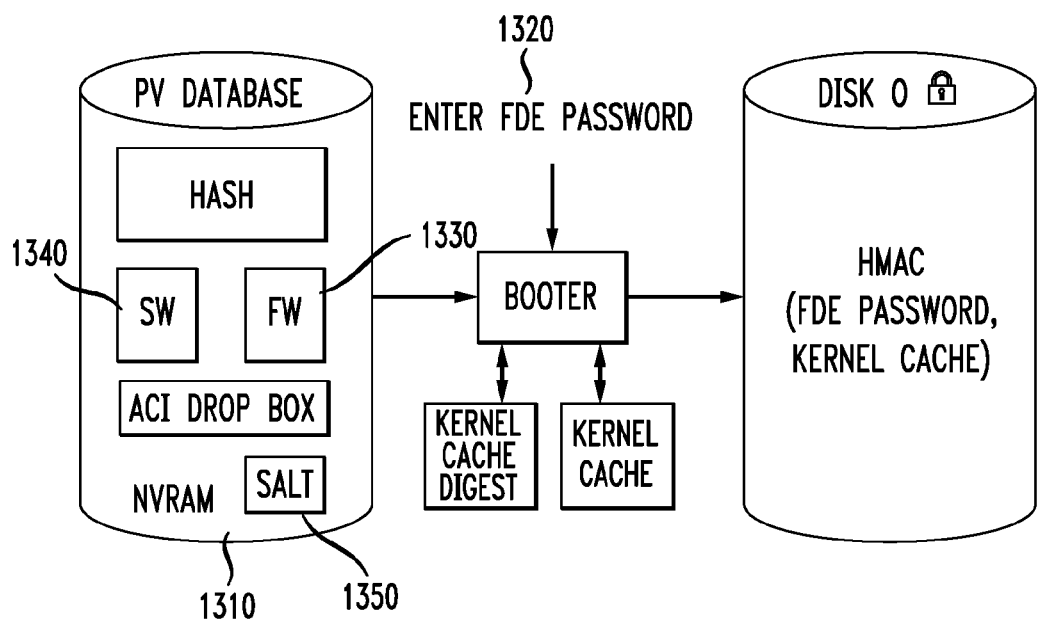
FIG. 13 illustrates establishing full disk encryption.

FIG. 13 illustrates generating a password proof. The partial password proof is secure, since it is not the raw password but a derivation of the password. A system 100 stores it in NVRAM 1310 for any process to read, even potentially malicious processes. A process must be in possession of the original password 1320 to get the proof to the halfway point. Then the firmware 1330 can iterate through the remaining iterations to verify that the proof came from a process that possessed the original password. This process lends itself to automatic improvement as hardware improves, since it runs the HMAC iteration in a loop until a set amount of time is reached and can easily adapt to newer, faster hardware. Faster hardware can simply run a higher number of iterations to achieve similar performance characteristics. The number of iterations can be selected or determined based on desired execution performance, security, and/or other characteristic threshold(s).

FIG. 14 illustrates disabling full disk encryption. The system generates 1410 a list of users authorized to disable tamper-resistant booting and sends 1420 the list to the firmware. The system generates 1430 password verifiers for each user and stores the verifiers as software 1340 in the NVRAM 1310. When the system issues a command with a password proof for a user, the system puts the password proof into a "dropbox" for the authenticated command interface (ACI) where the NVRAM 1310 reads the command on the next boot. Since the NVRAM is readable to the operating system and all users, any user can read the command placed in NVRAM and potentially steal the password proof. Traditionally, a salt is used to fix this problem. However, this is not easily accomplished. Thus, the system creates a system salt 1440 and stores the system salt in NVRAM 1450 when the machine boots the first time. The system salt stored in NVRAM is used for the next command issued to the firmware through the ACI interface. The firmware puts a new random salt in NVRAM each time a command is issued.

One new result achieved by the approaches set forth herein is a more secure boot process in a full-disk encryption enabled system that is able to detect unauthorized changes in the boot chain of trust. Another result of these approaches is enabling and/or disabling this secure boot with a minimal number of system reboots.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein are applicable to desktop and laptop computers, mobile devices, and any other computing environment with a suitable shared secret, such as a volume key, in which a secure, tamper-resistant boot process is desired. Those skilled in the art will readily recognize various modifications and changes that may be made to the principles described herein without following the example embodiments and applications illustrated and described herein, and without departing from the spirit and scope of the disclosure.

We claim:

1. A non-transitory computer-readable storage medium storing instructions which, when executed by a computing device, cause the computing device to perform a method to disable tamper-resistant booting on the computing device, the method comprising:
generating, at a firmware level, a password verifier by applying a number of iterations of an encryption algorithm to a salt value and a password associated with the tamper-resistant booting;
receiving, from a user, a request to disable the tamper-resistant booting, the request comprising a request password;
at an operating system level,
generating a password proof by applying a first portion of the number of iterations of the encryption algorithm to the request password and the salt value, wherein each iteration generates a current iteration password proof based on a previous iteration password proof generated during a previous iteration, and
storing a password proof generated from the last iteration of the first portion in a predetermined storage location;
restarting the computing device; and
at the firmware level during reboot of the computing device:
retrieving the password proof from the predetermined storage location,
performing a remaining second portion of the number of iterations to the password proof to yield an iterated password proof, such that the first portion of the number of iterations plus the remaining second portion of the number of iterations equals the number of iterations, and
disabling tamper-resistant booting if the iterated password proof matches the password verifier.

2. The non-transitory computer-readable storage medium of claim 1, wherein the number of iterations is established based on a desired execution interval.

3. The non-transitory computer-readable storage medium of claim 1, wherein the password verifier is stored in firmware.

4. The non-transitory computer-readable storage medium of claim 1, wherein the salt value is random.

5. The non-transitory computer-readable storage medium of claim 1, wherein the salt value changes each boot time.

6. The non-transitory computer-readable storage medium of claim 1, wherein the password proof is stored in non-volatile random access memory.

7. The non-transitory computer-readable storage medium of claim 1, wherein the encryption algorithm is a hash-based message authentication code algorithm.

8. The non-transitory computer-readable storage medium of claim 1, wherein generating the password verifier comprises:
using a password and a salt value as input for the first iteration of the encryption algorithm; and
using an output from an immediately preceding iteration of the encryption algorithm as an input for the respective iteration for each respective iteration after the first iteration.

9. A method to disable tamper-resistant booting on a computing device, the method comprising:
generating, at a firmware level, a password verifier by applying a number of iterations of an encryption algorithm to a salt value and a password associated with the tamper-resistant booting;

receiving, from a user, a request to disable the tamper-resistant booting, the request comprising a request password;

at an operating system level,
generating a password proof by applying a first portion of the number of iterations of the encryption algorithm to the request password and the salt value, wherein each iteration generates a current iteration password proof based on a previous iteration password proof generated during a previous iteration, and
storing a password proof generated from the last iteration of the first portion in a predetermined storage location;

restarting the computing device; and at the firmware level during reboot of the computing device:
retrieving the password proof from the predetermined storage location,
performing a remaining second portion of the number of iterations to the password proof to yield an iterated password proof, such that the first portion of the number of iterations plus the remaining second portion of the number of iterations equals the number of iterations, and
disabling tamper-resistant booting if the iterated password proof matches the password verifier.

10. The method of claim 9, wherein the firmware is one of a basic input/output system firmware and an extensible firmware interface firmware.

11. The method of claim 9, wherein the first number of iterations and the second number of iterations are established based on a desired execution interval.

12. The method of claim 9, wherein the firmware-generated password verifier is stored in firmware.

13. The method of claim 9, wherein the firmware-generated password verifier is generated as part of the process of enabling tamper-resistant booting.

14. The method of claim 9, wherein applying the encryption algorithm is further based on a random salt value.

15. The method of claim 9, wherein the password proof is stored in non-volatile random access memory.

16. A computing device, comprising:
a processor; and
a memory coupled to the processor to store instructions, which when executed by the processor, cause the processor to perform a method, the method including
generating, at a firmware level, a password verifier by applying a number of iterations of an encryption algorithm to a salt value and a password associated with the tamper-resistant booting;
receiving, from a user, a request to disable the tamper-resistant booting, the request comprising a request password;
at an operating system level,
generating a password proof by applying a first portion of the number of iterations of the encryption algorithm to the request password and the salt value, wherein each iteration generates a current iteration password proof based on a previous iteration password proof generated during a previous iteration, and
storing a password proof generated from the last iteration of the first portion in a predetermined storage location;
restarting the computing device; and
at the firmware level during reboot of the computing device:
retrieving the password proof from the predetermined storage location,
performing a remaining second portion of the number of iterations to the password proof to yield an iterated password proof, such that the first portion of the number of iterations plus the remaining second portion of the number of iterations equals the number of iterations, and
disabling tamper-resistant booting if the iterated password proof matches the password verifier.

17. The device of claim 16, wherein the firmware is one of a basic input/output system firmware and an extensible firmware interface firmware.

\* \* \* \* \*